United States Patent [19]

Schneider et al.

[11] 4,337,511
[45] Jun. 29, 1982

[54] DIGITAL CONTROL APPARATUS FOR THE RUNNING SPEED OF A MOTOR VEHICLE

[75] Inventors: Erich Schneider, Kirchheim; Helmut Fleischer, Schwieberdingen; Wolfgang Nonnenmann, Pforzheim; Benno Gerum, Stuttgart, all of Fed. Rep. of Germany

[73] Assignee: Robert Bosch GmbH, Stuttgart, Fed. Rep. of Germany

[21] Appl. No.: 190,318

[22] PCT Filed: Jun. 21, 1979

[86] PCT No.: PCT/EP79/00048
§ 371 Date: Mar. 15, 1980
§ 102(e) Date: Mar. 10, 1980

[87] PCT Pub. No.: WO80/00277
PCT Pub. Date: Feb. 21, 1980

[30] Foreign Application Priority Data

Jul. 15, 1978 [DE] Fed. Rep. of Germany ....... 2831238
Sep. 27, 1978 [DE] Fed. Rep. of Germany ....... 2842023

[51] Int. Cl.³ .................. G05D 13/58; B60K 31/00
[52] U.S. Cl. .................................. 364/426; 180/179; 364/565
[58] Field of Search ............... 364/424, 426, 565; 180/170, 174, 176, 177, 178, 179

[56] References Cited

U.S. PATENT DOCUMENTS

| | | | |
|---|---|---|---|
| 3,869,019 | 3/1975 | Cardani | 364/424 X |
| 3,885,137 | 5/1975 | Ooya et al. | 364/424 |
| 3,891,046 | 6/1975 | Oicles | 364/424 X |
| 3,941,202 | 3/1976 | Sorkin | 180/176 |
| 3,952,829 | 4/1976 | Gray | 364/426 X |
| 4,046,213 | 9/1977 | Larson | 364/426 X |
| 4,072,206 | 2/1978 | Larson et al. | 364/426 X |
| 4,094,378 | 6/1978 | Scheyhing et al. | 180/176 |
| 4,098,367 | 7/1978 | Fleischer | 180/179 |
| 4,138,723 | 2/1979 | Nehmer et al. | 364/424 |
| 4,140,202 | 2/1979 | Noddings et al. | 180/179 |
| 4,196,787 | 4/1980 | Sakakibara et al. | 180/179 |

Primary Examiner—Felix D. Gruber
Attorney, Agent, or Firm—Frishauf, Holtz, Goodman & Woodward

[57] ABSTRACT

A digital control apparatus for the running speed of a motor vehicle having an actual-value source, a memory for a demand-value which is proportional to the desired running speed, comparison means for executing an actual-value/demand-value comparison, and a setting device controlled by the output of the comparison means for controlling the throttle flap of an engine. Upon the actuation of a switch, the actual value is transferred into the demand-value memory apparatus and represents the running speed. To change the running speed by means of the control apparatus there is provided a second and auxiliary demand-value memory apparatus in which a ramp function is producible by means of a digital counting process. The given ramp value presents a supplementary demand-value during such an alteration of the running speed, i.e. the old running speed value is transformed into the new running speed value with the aid of the supplementary demand value. The ramp preferably has two distinguishable slopes, or one continuously decreasing slope.

30 Claims, 9 Drawing Figures

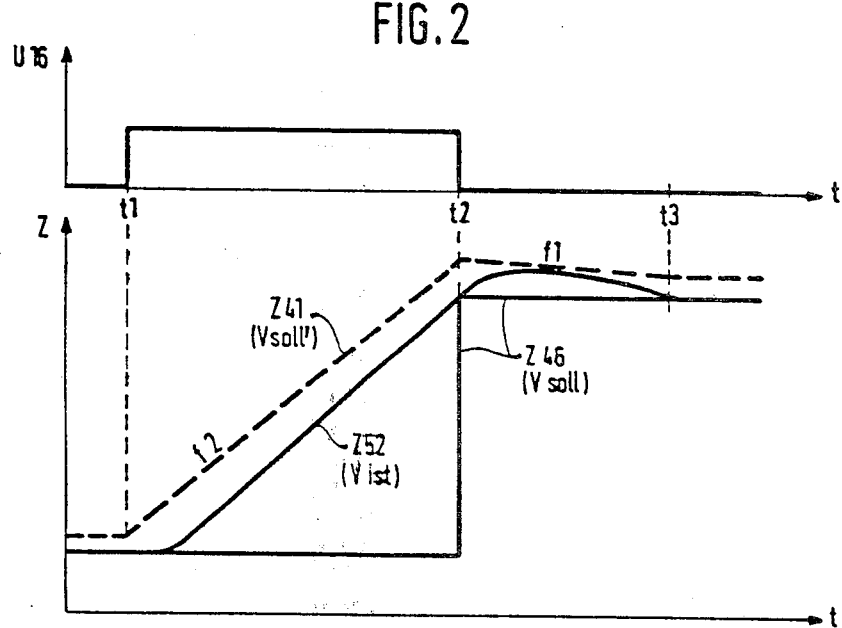
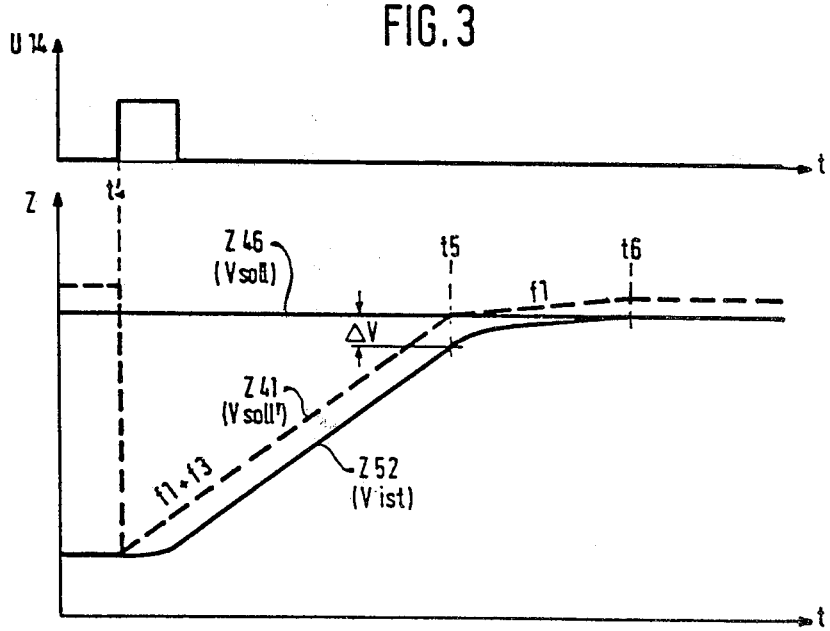

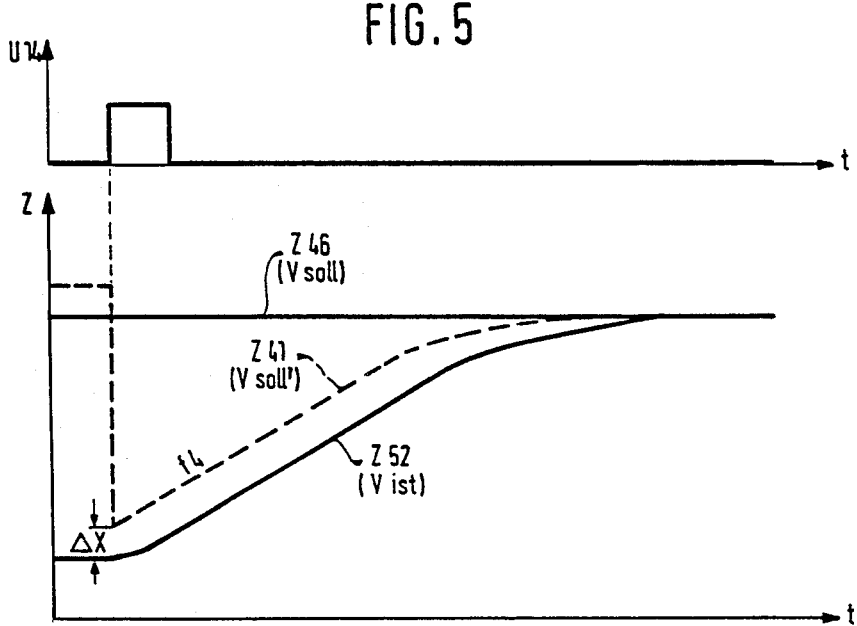
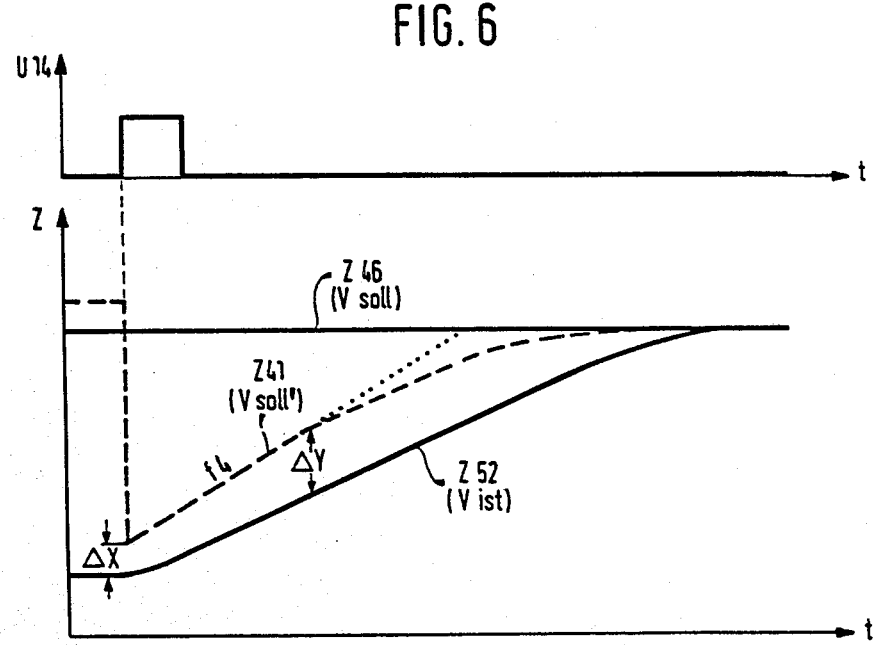

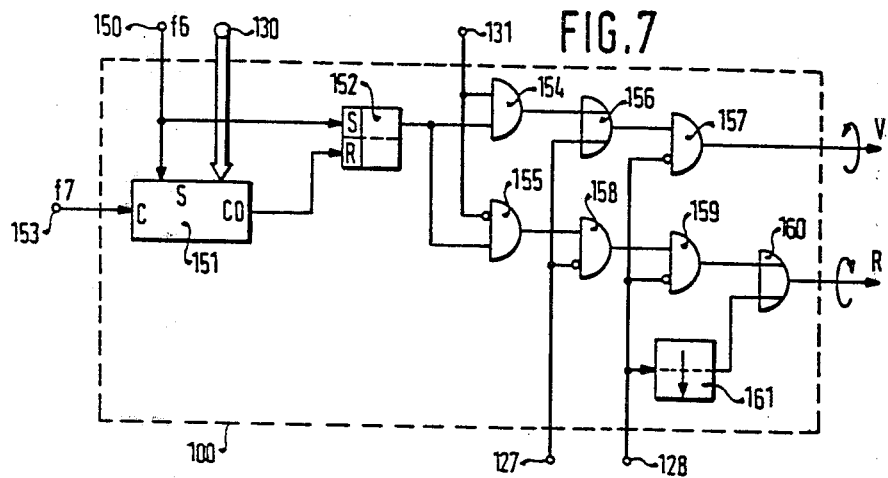
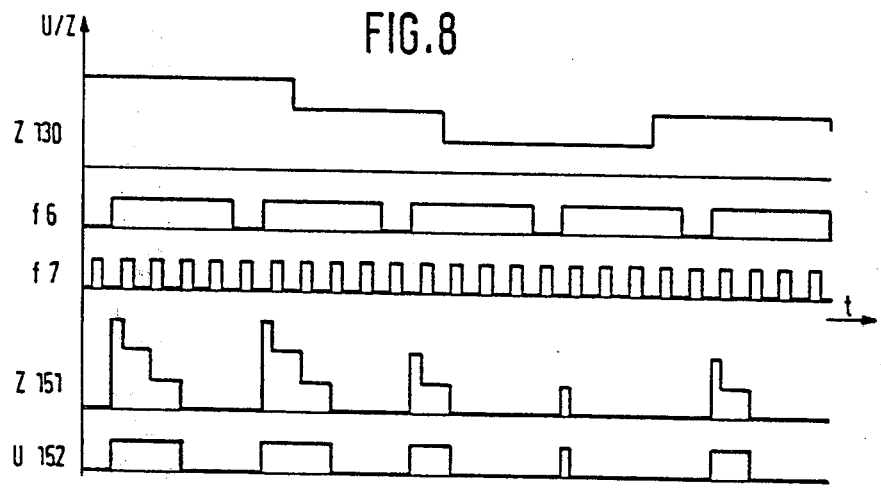
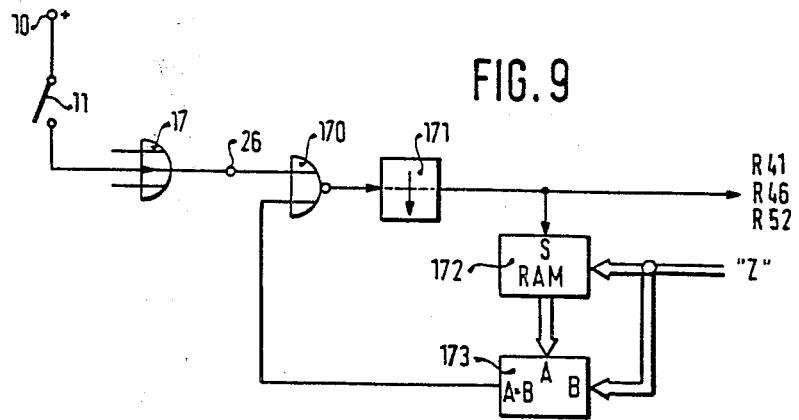

DIGITAL CONTROL APPARATUS FOR THE RUNNING SPEED OF A MOTOR VEHICLE

BACKGROUND OF THE INVENTION

The invention relates to a speed control apparatus for a motor vehicle.

Such a control apparatus is already known from DE-OS 2 546 529 (corresponds to U.S. Pat. No. 4,098,367), in which the new demand value is suddenly issued during changes of the running speed. Since the running speed reacts relatively sluggishly, there may occur control fluctuations which extend over several periods after the new demand value is reached. In order to decrease such overshoot, it is known from DE-OS 2 537 415 (corresponds to U.S. Pat. No. 4,094,378) to employ a controller with a PD-characteristic. However, a PD or P-controller causes the controlled speed to become inaccurate after the setting process due to differing loads and variable play in the positioning member linkage. By contrast, if an I-controller is used, one obtains poorer driving comfort.

SUMMARY OF THE INVENTION

The apparatus according to the invention has the relative advantage that the error becomes O after every setting process and that a soft transition can be accomplished through the transformation of the actual value into a demand-value differing therefrom, by means of a pre-programmed ramp function. The slow ramp function delays the ramp value until the actual value equals the demand value. The ramp value is then locked in as the demand value. By these means, all influences on the setting process are eliminated.

The use of a ramp function having two differing slopes wherein a relatively larger first slope is transformed into a relatively smaller slope at the end of the ramp, or a ramp function having a continuously decreasing slope is especially advantageous, and results in an even softer transition to the new running speed.

Optimal conditions are attained through the use of a microcomputer, preferably a 1-chip micro-computer. In this manner, the digital control apparatus is realizable very simply and price-favorably in small production volumes.

BRIEF DESCRIPTION OF THE DRAWINGS

FIG. 2 is a diagram representing an acceleration process carried out by the control apparatus of FIG. 1;

FIG. 3 is a diagram illustrating the process of the transformation of the running speed to a previously stored demand value;

FIG. 5 is a diagram similar to FIG. 3 for the second exemplary embodiment;

FIG. 6 is a diagram depicting the same process for the case of an inclined road;

FIG. 7 is a circuit representing a setting device embodied as a pulse controller;

FIG. 8 is a diagram explaining the functioning of the pulse controller of FIG. 7; and FIG. 9 is a circuit design of an initializing device.

DETAILED DESCRIPTION

Figure 1:
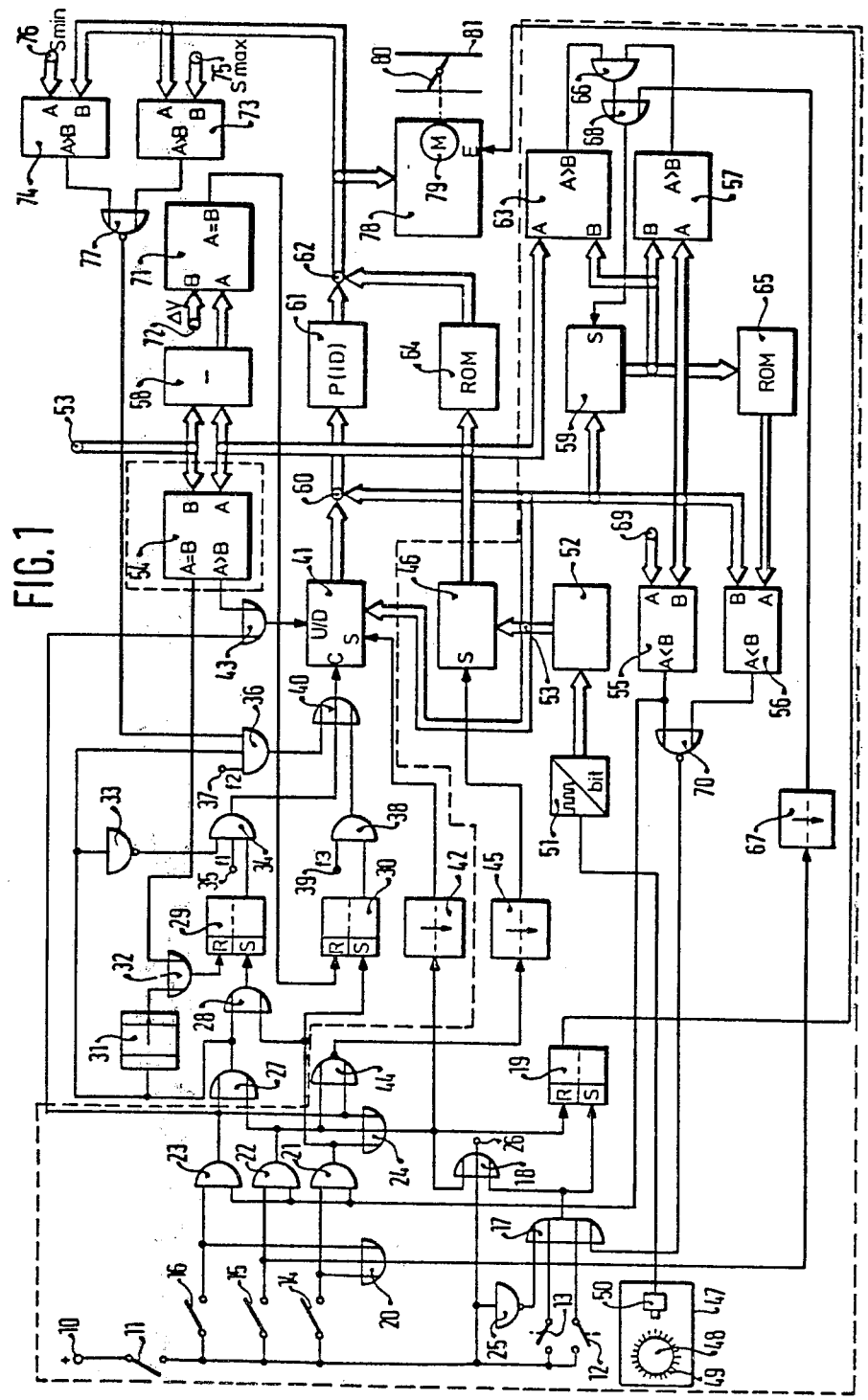
FIG. 1 is a circuit representing a first exemplary embodiment of the invention with a setting control circuit.

In the exemplary embodiment depicted in FIG. 1, a connector 10 at positive potential is connected via a main switch 11 controlling the voltage supply to five switching devices 12 to 16 preferably consisting of push button switches. The switches 12 and 13 are embodied as the brake switch and the clutch switch, respectively, and are closed when the mechanically interconnected brake or clutch is activated. Each of the switches 12, 13 is connected to a respective input of an OR-gate 17 whose output is connected both to an input of a further OR-gate 18 and to the Set-input S of a flipflop 19. The switches 14 to 16 are the command switches of the control apparatus. The first switch 14 constitutes a resumption switch, which permits a previously stored demand running speed to be resumed upon its actuation. The second switch 15 constitutes the deceleration switch and the third switch 16 constitutes the acceleration switch; i.e., a deceleration or an acceleration takes place upon actuation of one of these switches. The switches 15, 16 also serve for the storage and retention of the instantaneous running speed.

Each of the switches 14 to 16 is connected to one input of an OR-gate 20 as well as to three AND-gates 21 to 23, one AND-gate 21 to 23 being assigned to each switch 14 to 16. The outputs of the three AND-gates 21 to 23 are connected via an OR-gate 24 to the reset-input R of the flipflop 19 and also to a further input of the OR-gate 18. The main switch 11 is connected via an inverter 25 to a further input of the OR-gate 17, and also directly to a further input of the OR-gate 18 whose output is connected to a pin 26. The pin 26 is connected, in a manner not further described, to the reset input of the memory elements (for example, flipflops and counters) 41, 59. The pin 26 is not connected to the reset inputs of the actual-value memory 52 and the demand-value memory 46 which will be described later in greater detail.

The outputs of AND-gates 22, 23 are further connected via an OR-gate 27 to one input of an OR-gate 28 whose output goes to the Set-input S of a flipflop 29. The second input of OR-gate 28 is connected to the output of the AND-gate 21 as well as to the Set-input of a further flipflop 30. The output of the OR-gate 27 is connected via a delay element 31, acting upon the trailing edge of a signal, as well as via an OR-gate 32 connected in series with element 31, to the Reset-input R of the flipflop 29. The output of the OR-gate 27 is further connected via an inverter 33 to one input of an AND-gate 34, whose second input is connected to the output of the flipflop 29 and whose third input is connected to a pin 35 carrying a timing pulse frequency f 1. Finally, the output of the OR-gate 27 is connected to one of the inputs of an AND-gate 36, whose second input is connected to a pin 37 carrying a second timing pulse frequency f 2. The output of the flipflop 30 is connected to one input of an AND-gate 38, whose other input is connected to a pin 39 carrying a third timing pulse frequency f 3.

The outputs of the AND-gates 34, 36, 38, are connected via an OR-gate 40 to the clock input C of a digital counter 41 utilized as an auxiliary demand-value memory element. The output of the OR-gate 24 is connected via a timing element 42 consisting of, for example, a monostable multivibrator for the generation of a short Set-pulse, to the Set-input S of the counter 41. The output of the AND-gate 23 is connected via an OR-gate 43 to the counting-direction input U/D (Up/Down) of the counter 41.

The outputs of the AND-gates 22, 23 are further connected via a NOR-gate 44 to the trigger-input of a further timing-element 45 serving to generate a short Set-signal for a digital counter 46 connected to the output of the timing-element 45. The counter 46 constitutes the demand-value memory.

An rpm transducer 47 generates a frequency that is proportional to revolutions and consists of a rotatable disk 48 coupled to a wheel of the motor vehicle, and provided at its periphery with a plurality of ferro-magnetic marks 49. These ferro-magnetic marks move past an inductive pickup 50 where each of them induces a pulse. The output pulse-train of the rpm transducer 47 is converted by means of a frequency counter 51 into a data word, in particular into a binary number, which is transmitted to a digital register 52 which constitutes the actual-value memory and which routinely stores the current actual values. A frequency counter is known, for example, from U.S. Pat. No. 3,928,797; however, various other known principles and embodiments can be used for this function and for the rpm transducer 47.

The numerical outputs of the actual-value memory 52 are connected via a bus 53 to the numerical inputs of the following elements: The auxiliary demand-value memory 41, the demand-value memory 46, the inputs B of a first digital comparator 54, the inputs B of a second digital comparator 55, the inputs B of a third digital comparator 56, the inputs A of a fourth digital comparator 57, a subtractor stage 58 (preferably realized as an adder stage), a digital counter 59, as well as a control comparison point 60 (commonly embodied as an adder.) The numerical outputs of the auxiliary demand-value memory circuit 41 are likewise connected to the control comparison point 60, whose outputs are connected via a control stage 61 to a further control comparison point 62. This control stage 61 can have a P, I or D-characteristic, or a combined characteristic, depending upon the desired control properties. In the state of the art cited herein, a PD-controller is described and employed for a control apparatus for the running speed of a motor vehicle.

The numerical outputs of the demand-value memory circuit 46 are connected to the numerical inputs of the following elements: the inputs A of a first digital comparator 54, the subtraction stage 58, the inputs A of a fifth digital comparator 63, and the fixed-value memory (ROM) 64 whose outputs are connected to the control comparison point 62. The numerical outputs of the counter 59 are connected to the inputs B of the fourth digital comparator 57 and also of the fifth digital comparator 63, and are further connected via a fixed-value memory (ROM) 65 to the inputs A of a third digital comparator 56. The outputs of the comparators 57, 63, at which a signal is produced when the number appearing at the inputs A is greater than the number appearing at the inputs B, are connected via an AND-gate 66 and via an OR-gate 68 connected in series with the AND-gate 66 to the Set-input S of the counter 59. The output of the OR-gate 20 is connected via a timing element 67 to one input of the OR-gate 68 of the counter 59.

A connector device 69, preferably hard wired, applies a numerical value to the number inputs A of the second digital comparator 55; this numerical value represents the threshold for a minimal running speed V min, below which a shutdown of the control apparatus takes place.

The outputs of the digital comparators 55, 56, at which an output signal is produced when the numerical value appearing at the inputs A is less than the numerical value appearing at the inputs B, are connected via a NOR-gate 70 to a further input of the OR-gate 17.

The output of the second digital comparator 55 is also connected to further inputs of the AND-gates 21 to 23. One output of the first digital comparator 54, at which an output signal is produced when the numerical value appearing at the inputs A is greater than the numerical value appearing at the inputs B, is connected to a further input of the OR-gate 43. A second output of the comparator 54, at which an output signal is produced when the numerical input values are equal, is connected to a further input of the OR-gate 32. The numerical outputs of the subtraction stage 58 are connected to the numerical inputs A of a sixth digital comparator 71. A numerical value that is proportional to a speed difference which determines the bend-point of the ramp slope during the resumption process is applied to the numerical inputs B of the comparator 71 via a connector device 72, preferably by hard wiring. The output of the sixth digital comparator 71, at which an output signal is produced when the numerical values appearing at the inputs are equal, is connected to the Reset-input R of the flipflop 30.

The numerical outputs of the second control comparison point 62 are connected to the numerical inputs A of a seventh digital comparator 73 and to the numerical inputs B of an eighth digital comparator 74. A numerical value corresponding to a maximum setting magnitude S max which should not be exceeded is applied to the numerical inputs B of the comparator 73 via pin 75 preferably by means of hard wiring. A numerical value corresponding to a minimum setting magnitude S min which should not be exceeded negatively is applied to the numerical inputs A of the comparator 74 via a pin 76, preferably by means of hard wiring. The outputs of the comparators 73, 74 at which an output signal is produced when the numerical value applied to the inputs A is greater than the numerical value applied to the inputs B, are connected via a NOR-gate 77 to a further input of the AND-gate 36.

The numerical outputs of the second control comparison point 62 are further conducted to positioning control circuit 78 having a setting actuator 79 which can, for example, be embodied as a setting motor or as a setting magnet. An element 80, depicted in FIG. 1 as a throttle flap within a suction tube 81 of the combustion engine to influence the speed of the motor vehicle, is movable by means of the setting actuator 79. Other elements influencing the speed of a motor vehicle are, for example, the ignition time point, or the overall ignition timing or, in a fuel-injected engine, the position of the control rod of the injection pump, or the actuation time point of the injection valves. Positioning control circuits with setting actuators are known from the cited state of the art, and have also been proposed in digital form in DE-OS 2 746 545. An inhibit input E for the positioning control circuit 78, or for the setting actuator 79 thereof, is connected to the output of the flipflop 19.

The three timing pulse frequencies f1–f3 which are applied to the pins 35, 37, 39 can preferably be produced by means of a timing pulse generator not further described, the different frequencies being produced by frequency division. The four timing pulse frequencies used need not differ in every case, with the exception of the two frequencies used for the generation of the different ramp slopes.

The manner of functioning of the exemplary embodiment represented in FIG. 1 will be explained below with the aid of the diagrams depicted in FIGS. 2 and 3. At the outset, the vehicle will be assumed to move at a certain speed with the main switch 11 closed.

The vehicle is now intended to be accelerated by means of the control apparatus. To this end, the acceleration switch 16 is actuated, thereby setting the flipflop 29. Simultaneously, the flipflop 19 is set by the OR-gate 24, causing blockage of the positioning control circuit 78, or of the setting actuator 79, to be lifted. Simultaneously, an initialization of the memory system,—as already described—takes place via the OR-gate 18 and the pin 26. The counter 41 is loaded with the memory content of the actual value memory 52 by means of the short pulse of the timing element 42. During the time (as of the timepoint t1) when the signal U16 is present as a result of the actuation of the switch 16, the AND-gate 34 is blocked by means of the O-signal at the output of the inverter 33. However, the AND-gate 36 is opened by means of this signal U16 and the timing pulse frequency f2 can reach the clock input C of the counter 41 and cause an upward count from the numerical value corresponding to the actual value, because a 1-signal effecting the upward counting process is present at the output of the OR-gate 43 due to the signal U16. This upward counting results in an effective change of the demand value at the control comparison point 60, which in turn makes itself felt as an apparent diminution of the actual value at the control comparison point 62. The setting magnitude resulting therefrom causes an increase of the output power of the engine via the setting control circuit 78, and thereby effects an increase in the true actual-value, i.e. an increase of the numerical value in the actual-value memory 52. The increase continues until the switch 16 is again opened, or until the switch 16 embodied as a push button is released at the time point t2. The AND-gate 36 blocks the timing pulse frequency f2 and the lower timing pulse frequency f1 can now reach the clock input C of the counter 41 via the AND-gate 34. Simultaneously, the signal at the output of the AND-gate 23 causes a reversal of the counting direction via the OR-gate 43, and this reversed state is fixed by the output signal of the comparator 54. Finally, at the timepoint t2, the timing element 45 is triggered by means of the trailing edge of the signal U16 via the NOR-gate 44, and the short output pulse of the timing element 45 causes a setting of the demand-value memory 46 to the instantaneous actual value. At the control comparison point 62, a demand-value is now present which is formed with the aid of the value stored in the demand-value memory 46 on the basis of the characteristic operating curve of the control apparatus by means of the fixed-value memory 64. The numerical values deposited in the demand-value memory 46 form the addresses for the fixed-value memory 64. Due to the unavoidable sluggishness of any control system, the actual value exceeds the demand value by a small amount after the time t2. The feedback is supported by means of the declining ramp with the aid of the timing pulse frequency f1. When the stored demand-value equals the stored actual value at the timepoint t3, a reset-signal for the flipflop 29 is generated at the output "A=B" of the comparator 54 and terminates the counting process in the counter 41.

If the vehicle moves at the set speed, and if, for example, due to a dangerous situation, the brake or the clutch of the vehicle is engaged, one of the switches 12, 13 is actuated, leading to an initialization of the memory system via the pin 26, and also to a re-setting of the flipflop 19. By this action, the setting control circuit 78, or the setting actuator 79 is restored to the idle running position, and the vehicle is no longer influenced by the control apparatus. If the resumption switch is actuated the three flipflops 19, 29, 30 are set thereby firstly removing the inhibit signal applied to terminal E of the positioning control circuit 78 and simultaneously conducting the timing pulse frequencies f1 and f3 to the clock input C of the counter 41. These processes are depicted in FIG. 3 and begin at the timepoint t4. The counter 41 is set to that value of the actual-value memory 52 that is in effect at this time. Because the demand-value appearing at the inputs A of the comparator 54 at this time is greater than the actual-value appearing at the inputs B, a signal "A>B" is produced at the output and it causes an upward count of the counter 41 via the OR-gate 43. This upward counting continues until the differential amount between the demand-value and the actual value present at the output of the subtraction stage 58 has reached the value ΔV which can, for example, amount to three Kilometers per hour. Once this equality is attained, the flipflop 30 is re-set by means of the comparator 71, thereby blocking the AND-gate 38. As of this timepoint t5, a continuing counting process in the counter 41 is effected only by the frequency f1, thus creating a shallower ramp rise. This shallower ramp rise leads the actual value slowly toward the demand-value, thereby executing the adjustment of the operating point. As previously described, once the actual value reaches the demand value at the time t6, the flipflop 29 is reset by the output "A=B" of the comparator 54. The counting process in the counter 41 is now terminated.

The above-described processes take place in a corresponding manner in the reverse direction; i.e., upon actuation of the resumption switch 14 during an actual speed that lies above the demand speed, the counting process in the reverse direction, because the condition "A>B" is no longer present, and a O-signal is conducted via the comparator 54 to the count-direction input U/D of the counter 41. The system functions in the same way if a deceleration is effected by the control apparatus due to actuation of the deceleration switch 15. In a reversal of FIG. 2, the first part of the ramp now has a negative slope, whereas the second and shallower part of the ramp has a positive slope because, due to the slight overshoot of the actual value beneath the demand-value taking place after the release of the switch 15 via the output "A>B" of the comparator 54, a 1-signal is generated as the count direction signal and defines a positive counting direction.

The timing element 31 prevents the cutoff of the adaptation process at the instant of the release of the switch 16, or 15, because, at this moment, equality exists as between the demand value and the actual value. As a result, the comparator 54 would now re-set the flipflop 29 via the OR-gate 32. As the vehicle is now accelerating, the state of equality is upset and the adaptation proceeds in a controlled manner.

If one of the switches 15, 16 is momentarily actuated, a brief counting process does take place, according to FIG. 2, in the counter 41 in the positive, or a negative direction; however, this scarcely has any effect, because a secondary adaptation takes place immediately, according to FIG. 2, during this insignificant change of the counting state. In practice, the momentary actual value of the running speed is stored and retained during such a brief actuation.

In order to prevent the setting variable from being changed to values that can no longer be realized by the setting control circuit, or the setting actuator, the setting variable is limited by means of the comparators 73, 74. Either when the maximum setting magnitude S max applied to the comparator 73 is exceeded by the true setting magnitude, or when the minimum setting magnitude S min applied to the comparator 74 is exceeded negatively by the true setting magnitude, the corresponding comparator 73, 74 produces an output signal which blocks the AND-gate 36, thereby ending a further counting process in the counter 41 in the case of acceleration and deceleration.

In order to prevent an unintentional engagement of the control apparatus at low speeds, especially during maneuvering of the motor vehicle, during reversing, or in the event of a failure of the rpm transducer, a minimal running speed V min is provided by the comparator 55, below which speed the AND-gates 21 to 23 are continually blocked. A constant Reset-signal for the flipflop 19 is formed by the NOR-gate 70 and the OR-gate 17 whereby the setting actuator 79 is blocked.

Because all of the processes of regulation are controlled by way of ramps, the control deviation "demand value minus actual value" is small, and can be enlisted as a safety function. When the difference "demand value minus actual value" has exceeded a certain amount, this fact signifies a functional failure, for example, the interruption of the signal line from the brake or the clutch, a signal which would lead to a control disengagement. In this case, the controller should be automatically switched off. The actual value is continuously present at the counter 59. When the demand value exceeds the actual value currently present in the counter 59, a continuous Set-signal is produced for the counter 59 via the comparator 63 and the AND-gate 66 if the value simultaneously stored in the counter 59 is smaller than the true actual value. This second condition is set by the comparator 57. The peak actual value is thus continually stored in the counter 59, so long as the demand value remains higher than the actual value. If the vehicle decelerates under this condition, the actual value decreases; however, the value stored in the counter 59 remains unchanged. Now, a function is stored in the fixed-value memory 65 which defines the threshold beneath which an auxiliary cutoff is to take place.

This function is for example:
$Za = 0.75 \cdot Ze + Z10$
$Za$ = numerical output value;
$Ze$ = numerical input value; and
$Z10$ = numerical value corresponding to a speed of 10 Kilometers per hour.

Thus, if the actual-value sinks to three-quarters of its value plus 10 Kilometers per hour, then the 1-signal at the output of the comparator 56 switches to a 0-signal, thereby re-setting the flipflop 19 via the NOR-gate 70 and the OR-gate 17 and thus cutting off the setting actuator. The cutoff threshold can be programmed variably as a function of the speed by means of the function inserted into the fixed-value memory.

Upon opening the main switch 11, a reverse motion command, causing the setting-actuator 79 to assume the idle running position, likewise takes place via the inverter 25 and the OR-gate 17.

The second exemplary embodiment depicted in FIG. 4 once again contains the region of FIG. 1 enclosed by a broken line which contain the elements 10 to 26, 44–57, as well as 65–70. These component elements are interconnected in an identical manner and are not again shown here in detail. An important difference of the second exemplary embodiment relative to the first exemplary embodiment consists in the fact that no setting control circuit 78 is employed, i.e. no separate control circuit for the setting actuator 79 any longer exists. Such a control circuit 78, as utilized in the first exemplary embodiment, requires a signal generator e.g. a potentiometer, to supply the position feedback signal for the setting actuator 79. In the second exemplary embodiment, the setting actuator 79 is driven by a pulse-type controller 100, thereby eliminating the need for position feedback and thus also for an associated transducer.

The contacts 101 to 103 are connected to the outputs of the AND-gates 21–23. The contact 101 is connected to the reset-input R of a flipflop 104, whose output is connected via an OR-gate 105 to one input of an AND-gate 106. The output of the AND-gate 106 supplies the timing pulse signals for the clock input C of the counter 41 used as a ramp-value memory. As in the first exemplary embodiment, the counting direction input U/D of the counter 41 is controlled via the OR-gate 43 both by the output of the AND-gate 23 (from pin 103) as well as by the output "A>B" of the digital comparator 54 (from pin 107). The pins 101–103 are connected via an OR-gate 108 to a first, dynamic trigger input of a timing element 109, whose output is connected to the Set-input S of the counter 41 as well as to one input of an AND-gate 110. The first trigger input of the timing element 109 is triggerable by means of a positive pulse edge. The pin 102 is connected to a further, inverting input of the AND-gate 110 as well as to a further, dynamic trigger input of the timing element 109, which input is triggerable by means of a negative edge. The pins 102, 103 are further connected via an OR-gate 111 to the command-input "A=O" of a digital comparator 112. The output "A=B" is connected to the set-input S of the flipflop 104. The output of the OR-gate 111 is additionally connected to one input of an OR-gate 113 as well as to a further input of the OR-gate 105. The output of the flipflop 104 is connected via the OR-gate 113 to the switching input of a switching apparatus 114, preferably a multiplexer. The actual value present at the connector device 53 is applied to the inputs B of an adder 115, to the numerical inputs of a digital counter 116, to the numerical inputs B of a subtracter 117, to the address inputs of a fixed-value memory (ROM) 118, as well as to the actual value inputs of a control comparison point 119. The demand value applied via the outputs of the counter 46 to a connector device 120 is applied, firstly, to the numerical inputs B of the comparator 112 and further to first numerical inputs of the switching apparatus 114. The numerical outputs of the counter 41, which carry the ramp value, are connected to the numerical inputs A of the comparator 112, to the numerical inputs A of the subtracter 117, as well as to second inputs of the switching apparatus 114. The numerical outputs "B-A" of the comparator 112 are connected to the numerical inputs of a frequency generator 121, whose pull train output having a variable output frequency f4 is applied to a further input of the AND-gate 106. The numerical outputs "A-B" of the subtracter 117 are connected to the numerical inputs B of a comparator 122, and a fixed binary number Δ Y is applied to the numerical inputs A of the comparator 122. The output "A greater than B" is connected to a further input of the AND-gate 106.

The fixed binary number Δ X is applied to the numerical inputs A of the adder 115. The numerical outputs "A+B" are connected to the numerical inputs of the counter 41.

The output of the AND-gate 110, the pin 107, and a pin 123 connected to the output of the flipflop 19 are connected to respective inputs of the AND-gate 124, whose output is connected to the set-input S of a counter 116 and to the set-input of a flipflop 125. A timing pulse frequency f5 is conducted via a contact 126 to the clock input C of the counter 116. The overflow output CO (Carry Out) of the counter 116 is connected to the Reset-input R of the flipflop 125, whose output is connected via a contact 127 to the input of a pulse-type controller 100. An advantageous and suitable embodiment of such a pulse controller 100 is described in greater detail in conjunction with FIG. 7. The contact 123 is likewise further connected via a contact 128 to an input of the pulse controller 100.

The numerical outputs of the switching apparatus 114 are connected to the actual value inputs of the control comparison point 119, whose outputs are connected to the inputs A of a digital multiplier 129. The numerical outputs of the fixed-value memory 118 are connected to the numerical inputs B of this multiplier 129. The numerical outputs "A×B" are connected to the inputs of the pulse controller 100 via the P (ID)-controller 61 and via a connector device 130. A signal depending on the algebraic sign of the control-deviation is likewise conducted to the pulse controller 100, via a contact 131.

Figure 4:
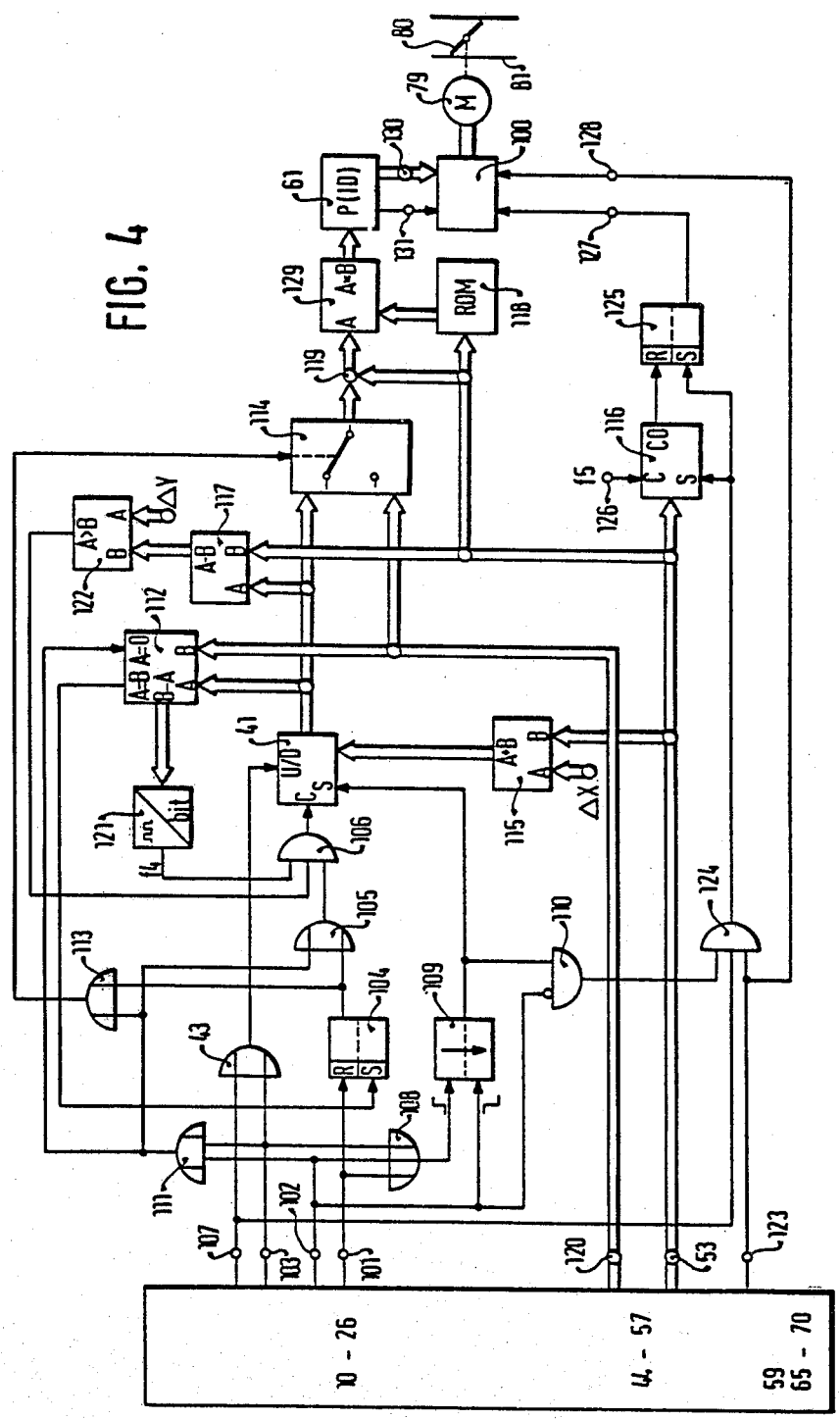
FIG. 4 is a circuit representing a second exemplary embodiment of the invention without a setting control circuit.

The manner of functioning of the control apparatus represented in FIG. 4 will be explained below with the aid of FIGS. 5 and 6, among others. The process of resuming a speed previously stored in the demand-value memory circuit 46 will be described first. The actuation of the resumption switch 14 causes a corresponding signal U14 to appear at the pin 101. By means of this signal, and the OR-gate 108 and the timing element 109, the counter 41 is set to a value corresponding to the actual value plus the fixed numerical value Δ X.

The flipflop 104 is also set, so that the timing frequency pulses f4 can reach the clock input of the counter 41, and are counted upward due to the presence of the 1-signal at the connector 107. As a result, the ramp value rises according to the broken line shown in FIG. 5. The frequency f4 depends on the difference of the demand-value minus the ramp-value. When that difference is, for example, greater than 10 Km/h, f4 can always be varied in correspondence to the desired maximum acceleration by means of appropriate dimensioning of the frequency counter 121. Therefore, the closer the ramp-value comes to the demand-value, the smaller f4 becomes. This takes place by means of the control of the frequency counter 121 through the output "BA" of the comparator 112. The ramp-value is thus brought continuously and slowly towards the demand-value. The same thing happens with the actual value, which follows the ramp-value with some delay. This slowly guided approach of the actual value prevents overshoot and results in a very good comfort. When the ramp-value reaches the demand value, a 1-signal is produced at the output "A=B" of the comparator 112, which resets the flipflop 104. The AND-gate 106 then prevents further counting processes. The switching apparatus 114 is also actuated by the OR-gate 113, so that now the demand-value from the pin 120 is again available at the control-comparison point 119, instead of the ramp value from the counter 41. The value of the control-deviation is multiplied in the multiplier 129 by a factor that is dependent on the actual-value, in order to obtain an improved stability in low-speed regions. Thus, for example, at higher speeds, the factor to be multiplied is 1, whereas at lower speeds this factor may be for example, 0.3, in order to reduce the amplification of the controller at lower speeds. This factor can be decreased practically continuously by means of the fixed-value memory 118, in which corresponding addresses are addressed by the actual value of the running speed. A specific multiplication factor can thus be assigned to every actual value of the speed. This multiplied control deviation controls the controller 100 via the controller 61 as will be explained in greater detail in conjunction with FIG. 7.

When the stored demand value is greater than the actual value (signal at the pin 107) and if, simultaneously, the flipflop 19 is reset due to an actuation of one of the switches 14 to 16 (signal at the pin 123), and if the switch 15 is not actuated (signal at the output of the AND-gate 110), then a Set-signal for the counter 116 and for the flipflop 125 is produced at the output of the AND-gate 124. The counter 116 accepts the instantaneous actual value which is counted down by means of the timing pulse signal f5. At the traversal of zero, a reset-signal is produced for the flipflop 125, so that a 1-signal is present at the connector 127 during the downward counting. The duration of this 1-signal depends upon the actual value and positions of the setting apparatus 79 (as will be explained in greater detail with the aid of FIG. 7) which has a position that is dependent upon the actual value. Because the setting apparatus 79 is returned to the null setting after each actuation of the brake or of the clutch, and after each disengagement of the control apparatus (0-signal at the pin 123), this approach to the actual value setting by the setting apparatus 79 hastens the attainment of the desired speed. The actual value is approached with the greatest possible setting speed independently of the control deviation. This takes place in the following cases by means of the logic function of the AND-gate 124, i.e. upon actuation of the acceleration switch 16 (signal at the pin 103), upon actuation of the resumption switch 14 (signal at the pin 101), and when the to-be-approached stored speed value lies higher than the actual value, and, finally, upon release of the deceleration switch 15 (trailing-edge signal at the pin 102).

FIG. 6 represents the case in which, after the actuation of the resumption switch 14, the actual value cannot follow the changing ramp value due to, for example, an inclined roadway. Too large a difference between these values would have the effect that the ramp can depart arbitrarily from the actual value. Once the load disappears, the vehicle would be subjected to much too large an acceleration (full throttle). This is prevented by the fact that, during a deviation exceeding Δ Y, the comparator 122 produces a 0-signal at its output which blocks the AND-gate 106 for the timing pulse signals f4. The ramp is thereby briefly stopped; however, it continues again immediately when the difference Δ Y is once again exceeded negatively due to a further rise of the actual value. The rise of the ramp is decreased by means of this switching-on and switching-off of the counting frequency f4, and so runs parallel to the actual value. By means of this adaptation of the ramp slope to the actual value slope, a soft transition to the demand speed is also achieved during passages over inclined roadways.

The case of acceleration as a result of the actuation of the acceleration switch 16 proceeds essentially according to FIG. 2. Differences derive from the fact that the actual value plus $\Delta X$ is once again accepted as the initial value into the counter 41. As a result of a signal at the output of the OR-gate 111, the numerical inputs A of the comparator 112 are set to the value 0, in order to produce a maximum difference "B-A". This in turn produces a maximum ramp frequency f4. When the switch 16 is released, the currently present actual value is accepted into the demand value memory circuit 46 according to the first exemplary embodiment. In contrast to the first exemplary embodiment, the ramp value present at this timepoint is retained in the counter 41. However, this no longer has any meaning, because the switching apparatus 114 is switched simultaneously to the demand value memory circuit 46.

The circuit according to FIG. 7 shows an advantageous embodiment of the pulse controller 100. A timing pulse frequency f6 is conducted via a pin 150 to the set-input of a counter 151 and to the Set-input of a flipflop 152. A further and higher timing pulse frequency f7, for example the frequency of the rpm transducer 47, is conducted to the clock-input C of the counter 151 via a pin 153. The numerical outputs of the controller 61 are connected via the connector device 130 to the numerical inputs of the counter 151. The overflow output CO of the counter 151 is connected to the Reset-input of the flipflop 152 whose output is connected to one of the inputs of each of two AND-gates 154, 155. The pin 131 is connected both to a second input of the AND-gate 154 and to a second and inverting input of the AND-gate 155. The output of the AND-gate 154 is connected via an OR-gate 156 to one input of an AND-gate 157 whose output controls the forward movement "V" of the setting actuator 79. The output of the AND-gate 155 is connected via an AND-gate 158 to one input of an AND-gate 159 whose output controls the backward movement "R" of the setting actuator 79 via an OR-gate 160.

The pin 127 is connected to a further input of the OR-gate 156 and to a further and inverting input of the AND-gate 158. The pin 128 is connected firstly to one inverting input of each of the AND-gates 157, 158 and finally via a timing element 161 to a further input of the OR-gate 160.

The manner of functioning of the pulse controller 100 represented in FIG. 7 consists of the conversion of a binary number present at the connector device 130 into a pulse sequence whose duty cycle is proportional to this binary number. It is significant that these output pulses are whole-number multiples of the periods or half-periods of the input pulse sequence. This is important primarily if the control apparatus is based on a microcomputer with which no parallel processing is possible. Thus, after each computation cycle—during the measurement phase—the motor is addressed by a number of rpm transducer periods (or half periods) determined by means of the computation. The diagram of FIG. 8 represents a changing binary number Z 130. The binary number present at the timepoint of each leading edge of the signal sequence f6 is transferred into the counter 151. The flipflop 152 is simultaneously set.

This transferred numerical value is counted down at the pulse rate of the higher timing pulse frequency f7, and the overflow pulse resets the flipflop 152. A signal sequence U 152 is thereby produced at the output of the flipflop 152, and its duty cycle is proportional to the binary number Z 130. Depending on the signal present at the pin 131 serving for the fixation of the setting direction, this signal sequence U 152 is present at one of the outputs of the AND-gates 154, 155. If a 0-signal is present at the pin 127 (implying no forward movement of the setting actuator 79 to the actual value setting) and a 1-signal is present at the connector 128 (implying no switching-off of the setting actuator due to, for example, a brake switch actuation), then the outputs of the AND-gates 154, 155 alternatively drive one of the outputs V or R, respectively, of the pulse controller 100 in accordance with the given setting direction. The pulse sequence U 152 then results either in a forward or in a backward movement of the setting actuator 79. If, in accordance with the description of FIG. 4, a forward signal for the setting of the actuator 79 to the actual value setting is produced at the pin 127, then the AND-gate 158 is blocked, and this signal acts directly on the output V. If, due to a switching-off process, (for example a braking) a 1-signal is applied to the pin 128, then the AND-gates 157, 159 are blocked, and the pulse sequence U152 can no longer reach the setting actuator 79. This 1-signal triggers the time element 161, whereby a backward movement signal is produced during the holding time of this timing element at the output R for the setting actuator 79. The setting actuator 79 is returned to the 0-setting by means of this backward movement signal. Of course, the setting actuator 79 cannot be controlled directly by means of the outputs of the gates 157, 160, so that amplifier stages must be inserted in between. Such an output stage arrangement is, for example, known from the DE-OS 2 609 842. Furthermore, the output frequency of the rpm transducer 47 can also advantageously be enlisted instead of the frequency f7.

FIG. 9 represents an initialization circuit for the memory elements (for example flipflops and counters). As in the first exemplary embodiment, the inputs of the OR-gate 17 are connected to those devices which should cause an initialization, i.e., resetting of the memory circuits. The main switch 11 is, however, connected to a dynamic input of the OR-gate 17. The output pin 26 in turn is once again connected to all of the memory elements with the exception of the actual-value memory element 52, the demand-value memory element 46, and the ramp-value memory element 41. The memory elements connected to the pin 26 are reset into their base setting by means of an output signal of the OR-gate 17. The pin 26 is connected via a NOR-gate 170 to the trigger input of a timing element 171, whose output is connected to the Reset-inputs of the memory elements 41, 46, 52 and to the Set-input of a working memory (RAM) 172. The numerical outputs of this working memory 172 are connected to the numerical inputs A of a comparator 173, whose output "A=B" is connected to a further input of the NOR-gate 170. The numerical inputs B of the comparator 173 and the numerical inputs of the working memory 172 are supplied with a fixed binary number Z.

The functioning of the initialization circuit depicted in FIG. 9 is as follows: after a short 1-signal, a 0-signal once again appears at the output of the OR-gate 17 as a result of the dynamic input of the OR-gate 17 upon the closing of the main switch 11, i.e., upon the switch-on of the apparatus. Since the condition "A = B" in the comparator 173 is initially not fulfilled, the time element 171 is triggered and resets the memory elements 41, 46, 52. The binary number Z is simultaneously transferred into the working memory 172, so that now the condition "A = B" is fulfilled and the NOR-gate 170 remains closed for any further sort of signals at the pin 26. A further resetting of the memory devices 41, 46, 52 is thus no longer possible, not even by input-related noise pulses. A resetting of these memory devices 41, 46, 52 is possible again only after the voltage supply has been switched off and the main switch 11 is again being closed.

The functions of the previously described elements can preferably be realized by means of a micro-computer, especially a 1-chip micro-computer, such as is available commercially. This leads to a simple and inexpensive realization combined with small space requirements. The previously described functions are inserted into such a micro-computer as a program in a manner familiar to the person skilled in the art.

The following table lists components available in commerce which can, for example, be used in the above described circuit arrangements. The components are identified by their type numbers. The manufacturer shown in the parentheses serves as an example and may not be the only manufacturer of the given component:

| 1-Chip micro-computer | 8048 or 8021 | (INTEL) |
|---|---|---|
| Fixed-value memory (ROM) | CDP 1833 CD | (RCA) |
| Digital Counter | 4029 | (RCA) |
| Digital Comparator | MC 14585 | (MOTOROLA) |
| Working memory (RAM) | CDP 1824 | (RCA) |
| Subtracter (Adder) | CD 40181B | (RCA) |
| Multiplier | CD 4527B | (RCA) |
| Multiplexer | 4052 | (RCA) |
| Number-frequency Converter | SN 7497N | (TI) |

We claim:

1. In a digital control apparatus for controlling the running speed of a motor vehicle comprising an actual-value sending unit for sending a signal corresponding to the actual value of the vehicle running speed; a demand-value memory means (46) for storing a demand-value that is a function of the desired running speed of the vehicle; at least one switching means (14); means for transferring said actual value into said demand-value memory apparatus upon the actuation of said at least one switching means (14); comparing means (54) for comparing said actual-value with said stored demand-value; and control means responsive to said comparing means for controlling an element of the motor vehicle influencing the speed of the motor vehicle;

the improvement comprising:

an auxiliary demand-value memory apparatus (41) for generating a ramp function signal by means of a digital counting process, said auxiliary demand-value memory apparatus being coupled to said control means for supplying said ramp function signal as a supplementary demand-value during a running speed alteration to be effected by the control apparatus.

2. Apparatus according to claim 1, wherein said ramp function signal has two portions having respective distinguishable slopes, said portions comprising respectively an initially relatively steep slope portion which is transformed into a relatively more gradual slope portion at the end of the ramp function signal.

3. Apparatus according to claim 2, wherein substantially the instantaneous actual-value of the vehicle running speed is transferred into said auxiliary demand-value memory apparatus (41) if a demand-value is stored in the demand-value memory means (46) and during the actuation of said at least one switching means (14), said instantaneous actual-value transferred into said auxiliary demand-value memory apparatus (41) being altered by means of said steep slope portion of said ramp function signal until such time as the actual-value deviates from the demand-value by a fixed amount ($\Delta V$) as determined by said comparing means, and, as of this time-point when said deviation reaches said fixed amount ($\Delta V$), the more gradual ramp slope portion of said ramp function signal becomes effective to alter said instantaneous actual-value until the actual-value corresponds to the desired demand-value.

4. Apparatus according to claim 1, wherein substantially the instantaneous actual-value is transferred into said auxiliary demand-value memory apparatus (41) if a demand-value is stored in said demand-value memory means (46) and during the actuation of said at least one switching means (14); the instantaneous actual-value transferred to said auxiliary demand-value memory apparatus (41) being altered by means of said ramp function signal until such time as it is determined by said comparing means to correspond to the stored demand-value, and means responsive to the output of said comparing means for causing the ramp slope of said ramp function signal to become continuously more gradual as a dependent function of the difference between the actual-value and the stored demand-value.

5. Apparatus according to claim 2, comprising a further switching means (15 or 16) for triggering an acceleration process, and wherein upon actuation of said further switching means substantially the instantaneous actual-value of vehicle speed is transferred into said auxiliary demand-value memory apparatus (41), said instantaneous actual-value transferred into said auxiliary demand-value memory apparatus being altered by means of said ramp function signal in correspondence with the duration of the actuation of said further switching means (15 or 16), and, immediately thereafter, the actual value is transferred into the demand-value memory means (46).

6. Apparatus according to any one of claims 3, 4 or 5, further comprising means (115) for adding a programmed value to the actual-value of vehicle speed to slightly alter the actual-value, the slightly altered instantaneous actual-value being transferable into said auxiliary demand-value memory apparatus (41).

7. Apparatus according to claim 5, wherein, after the actuation of said further switching means (15 or 16), the more gradual ramp slope portion takes effect with an inverted algebraic sign until the actual value corresponds to the demand value.

8. Apparatus according to claim 7, further comprising means (115) for adding a programmed value to the actual-value of vehicle speed to slightly alter the actual-value, the slightly altered instantaneous actual-value being transferable into said auxiliary demand-value memory apparatus (41).

9. Apparatus according to claim 5, wherein slope fixing means (112, 121) is provided for the fixation of the ramp slope of said ramp function signal, said slope fixing means including a control apparatus (111, input A = O of 112) responsive to actuation of said further switching means for fixing the ramp slope of said ramp function signal at a maximum value during an actuation of said further switching means (15 or 16).

10. Apparatus according to claim 9, further comprising means (115) for adding a programmed value to the actual-value of vehicle speed to slightly alter the actual-value, the slightly altered instantaneous actual-value being transferable into said auxiliary demand-value memory apparatus (41).

11. Apparatus according to claim 5, wherein said further switching means (15, 16) includes first and second further switching devices for triggering a positive and a negative acceleration process, respectively.

12. Apparatus according to claim 11, wherein the actual-value of vehicle speed is additionally transferred into the demand-value memory apparatus (46) upon actuation of one of said first and second further switching devices (15, 16) to supply the instantaneous actual value of vehicle speed as a further demand running-speed value upon the actuation of said one of said first and second further switching devices (15, 16).

13. Apparatus according to any one of claims 1, 2, 3, 4 or 5, further comprising means for detecting at least one predeterminable end value (S min, S max), and a switching-off device (73, 74, 77) triggerable when at least one predeterminable end value (S min, S max) is reached for stopping generation of said ramp function signal.

14. Apparatus according to any one of claims 1, 2, 3, 4 or 5 wherein means (117) are provided for the recognition of the difference between the ramp-value and the actual value, and that a threshold value recognition circuit 122) is provided by means of which a further alteration of the ramp value is preventable when a maximally allowable difference is exceeded.

15. Apparatus according to any one of claims 1, 2, 3, 4 or 5, comprising a fixed-value memory (ROM 64) for modifying the demand-value stored in the demand-value memory apparatus (46) in correspondence with the characteristic working curve of the engine of the vehicle and of the control apparatus.

16. Apparatus according to claim 1, wherein the control system has P and/or I and/or D type control characteristics.

17. Apparatus according to claim 1, including means for shutting off the control apparatus when the actual value of vehicle speed exceeds a predeterminable value (V min) in the negative direction.

18. Apparatus according to claim 1, including means for shutting off the control apparatus when the difference of the peak value (maximum demand value) minus the actual value of vehicle speed exceeds a predeterminable value.

19. Apparatus according to claim 18, wherein the predeterminable value is a dependent function of the vehicle running speed.

20. Apparatus according to claim 1, comprsing means responsive at least to braking or clutching events in the vehicle for switching off the control apparatus.

21. Apparatus according to any one of claims 1, 2, 3, 4 or 5, comprising an actual-value memory (52) coupled to an actual-value sending unit (50) for continually storing the true actual-value of vehicle speed.

22. Apparatus according to claim 1, comprising means responsive to actuation of said at least one switching means for resetting said auxiliary demand-value memory apparatus (41).

23. Apparatus according to claim 1, comprising means for resetting each memory apparatus upon the switching-on the supply voltage, and a blocked state apparatus (170 to 173) for preventing succeeding signals from further resetting the memory apparatuses.

24. Apparatus according to any one of claims 1, 2, 3, 4 or 6, comprising a setting device (78, 100); and a switching device (114) for switching between said demand-value memory apparatus (46) and said auxiliary demand-value memory apparatus (41), where the content of the auxiliary demand-value memory apparatus (41) is transmitted by the switch (114) as the demand value for the control of the setting device (78, 100) until a state of equality is established between the ramp value and the demand value.

25. Apparatus according to any one of claims 1, 2 or 3, comprising means (118, 129) for multiplying a control-difference by a factor which is dependent upon the actual value of vehicle speed.

26. Apparatus according to claim 31, comprising a setting control circuit (78) for setting the apparatus.

27. Apparatus according to claim 26, wherein said setting control circuit includes a pulse-type controller (100) provided as a setting device in which the setting magnitude is converted into a pulse voltage having a duty cycle that is dependent upon the setting magnitude.

28. Apparatus according to claim 27, wherein the pulse-type controller (100) includes a counting apparatus (151) into which the setting magnitude present as a binary number is transferred at the pulse rate of a first timin pulse frequency (f6), the transferred values being counted out at the pulse rate of a second and higher frequency (f7), wherein the out-counting time determines the pulse width of the given signals of the pulse voltage.

29. Apparatus according to claim 28, comprising an rpm transducer coupled to the vehicle engine, and wherein the output frequency of the rpm transducer (47) is used as the higher frequency (f7), the controlling of a setting actuator (79) of the setting apparatus always takes place during one measurement phase of this frequency (f7).

30. Apparatus according to claim 29, including a control device (116, 125, 156, 158) coupled to the setting actuator (79) to directly switch on the setting actuator so that the setting actuator is movable into a position corresponding to the actual value present at that time, upon actuation of said at least one switching device.

* * * * *

UNITED STATES PATENT AND TRADEMARK OFFICE
CERTIFICATE OF CORRECTION

PATENT NO. : 4,337,511
DATED : June 29, 1982
INVENTOR(S) : Erich SCHNEIDER et al It is certified that error appears in the above—identified patent and that said Letters Patent is hereby corrected as shown below:

Column 8, line 66, change "pull" to --pulse--;

Column 16, line 18, change "6" to --5--;

Column 16, line 31, change "31" to --1--.

Signed and Sealed this

Nineteenth Day of October 1982

[SEAL]

Attest:

Attesting Officer

GERALD J. MOSSINGHOFF

Commissioner of Patents and Trademarks